July 21, 1959     J. M. WOUGHTER     2,895,648
MIXING AND DISPENSING SYSTEM
Filed Oct. 15, 1956
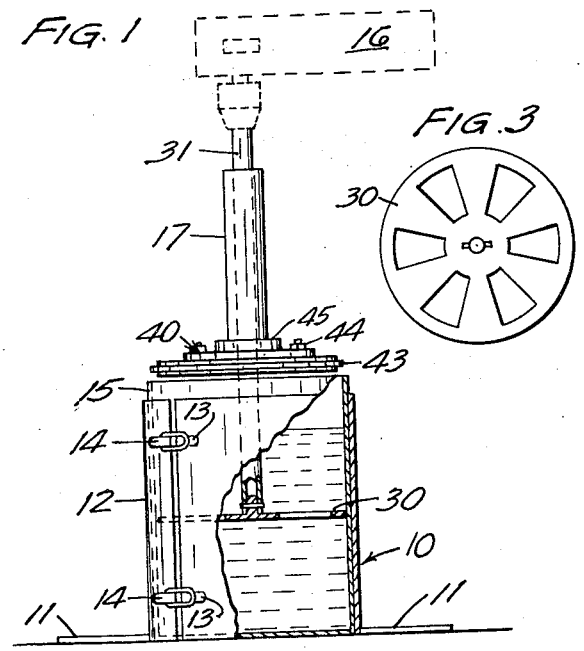
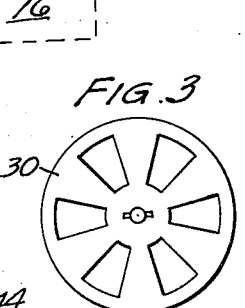
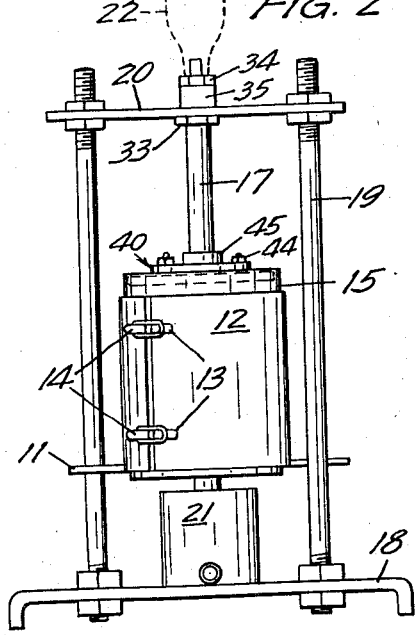
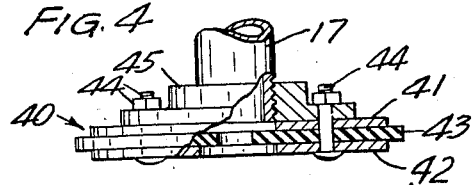
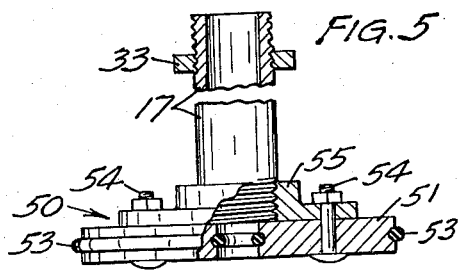
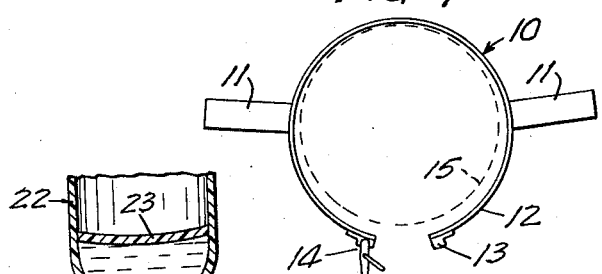
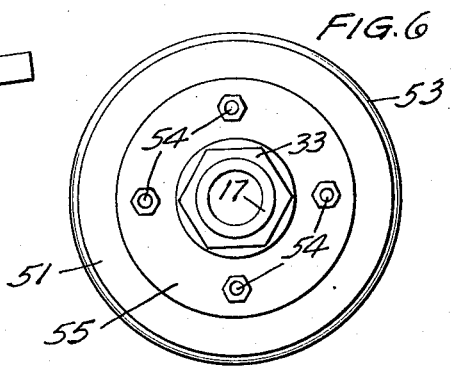
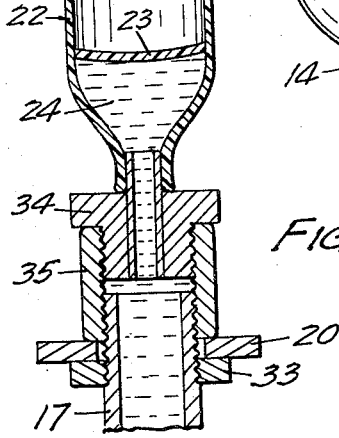
INVENTOR.
JOHN M. WOUGHTER
BY
Carpenter, Abbott, Coulter & Kinney
ATTORNEYS

United States Patent Office 2,895,648
Patented July 21, 1959

2,895,648

MIXING AND DISPENSING SYSTEM

John M. Woughter, Detroit, Mich., assignor to Minnesota Mining and Manufacturing Company, St. Paul, Minn., a corporation of Delaware Application October 15, 1956, Serial No. 615,967

6 Claims. (Cl. 222—235)

This invention relates to systems for handling multi-component self-curing adhesive and coating compositions. More particularly, the invention provides means for rapidly and effectively mixing together a plurality of inter-reactive, difficultly mixable, viscous or plastic components and of then dispensing the resulting rapidly self-curing mixture for subsequent use, while avoiding loss and waste of material and undue reaction of the mixture.

The system has been applied particularly to the mixing and dispensing of rapidly reactive putty and sealing compounds such as are employed in the glazing of metal and wood sash in large office buildings and the like.

Such glazing compositions are ordinarily supplied in multiple-container packages, the separate components being mixed together just prior to application. In an illustrative specific instance, one component consists essentially of reactive liquid polysulfide polymer ("Thiokol LP-2"), combined with pigments and with small amounts of compatible resinous tackifiers; the other component consists of a concentrated fluid slurry of lead peroxide curing agent. When the two are mixed in appropriate proportions, a curing reaction is initiated which at normal room temperatures shortly converts the initial viscous fluid mixture to a tough, rubbery mass which is firmly adherently bonded to surfaces contacted. Such mixtures may be applied as putty in the glazing of metal or wood sash, and when so applied are found to provide improved handling characteristics, weather resistance, and other necessary properties.

One way of applying the putty-like composition to the sash, which has been found highly effective, is to force the material from a suitable caulking gun under controlled pressure. One form of gun which has given good results employs a refillable polyethylene capsule. Air pressure is provided to force the putty material from the capsule to the desired location through a suitable nozzle or orifice, the air pressure being suitably controlled by valve or trigger means. Emptied capsules are returned for refilling. The filled capsules may be preserved under refrigeration for several hours or more, thus permitting adequate time for filling the capsules and transporting them to the worker.

A major difficulty involved in the supplying of such filled capsules to the worker has been in providing sufficiently rapid mixing of the components and filling of the capsules so as to prevent undue progress of the reaction before the material can be refrigerated and transported. Even though such moderate quantities as single gallons are mixed at one time, it is found that normal on-the-job hand-mixing techniques require far too long—and incidentally are far too messy—to insure delivery of a satisfactory caulking material to the worker.

The present invention provides means for effectively and rapidly mixing and dispensing reactive components as hereinbefore suggested. The equipment is simple, may be made readily available, and is surprisingly inexpensive. It is highly efficient in the hands of unskilled workmen, and has been found extremely effective under a wide variety of working conditions. Mixing of one gallon quantities of cement compositions of the type hereinbefore specifically described is effectively accomplished within not more than five minutes, and the same quantities of mixture may be loaded into the appropriate number of dispensing capsules within not more than an additional five or ten minutes. The filled capsules may then be stored in a cold-chest in the presence of dry ice, and are found to be in suitable condition for application as glazing or caulking compound after storage under such conditions for as long as 6–8 hours.

The apparatus will now be described in terms of the accompanying illustrative drawing in which:

Figure 1 is a side elevation of the mixing apparatus;

Figure 2 is a side elevation of the apparatus in position for dispensing;

Figure 3 is a detail plan view of a preferred agitator plate;

Figures 4 and 5 are views in elevation and partly in section of alternative cover or pressure plate elements;

Figure 6 is a plan view of a cover element;

Figure 7 is a plan view of a jacket unit as employed in Figures 1 and 2, and;

Figure 8 is a detail sectional view showing a dispenser cartridge fitted to the adapter element of Figure 2 and in process of being refilled.

In Figure 1, a jacket unit 10, shown in Figure 7 to consist of base strips 11 and a flexible jacket 12 fitted with cooperating quick-acting clamp elements 13, 14, is clamped around a thin-wall open-head constant-diameter shipping container 15. A stirrer, consisting of an agitator plate 30 equipped with a bayonet type clamp member and removably mounted on a spindle 31, is introduced into the container 15, containing the plastic polymer and curing agent therefor. A cover 40, fitted with an adapter 17 having a collar 33, is placed over the spindle 31 and seals the mouth of the container. The agitator is then connected to a source of power such as an electric drill 16, and the agitator is rotated and also raised and lowered vertically within the container, producing violent agitation and causing complete and homogeneous mixing of the reactive components within a short time. The power source is then disconnected, and the spindle detached from the cover member 40 and removed.

The assembly is next placed in a press unit as shown in Figure 2. The press unit, consisting of a base 18, side arms 19, upper bracket 20, and hydraulic jack 21, applies force on the jacket 10 and adapter 17, forcing the cover 40 into the container 15 and thereby forcing the plastic contents of the container through the adapter and into one of a series of dispensing units 22. The adapter 17 is of sufficient length to permit substantially complete emptying of the container 15. The cover 40 fits tightly against the sides of the container and prevents by-passing of any of the plastic contents as is slides into the container.

Typical cover structures are illustrated in Figures 4 and 5 taken in conjunction with Figure 6.

In Figure 4, the cover 40 is shown to include two metal discs 41 and 42 separated by a rubber gasket 43, the components having a central opening and being held together by bolts 44 bearing against an upper flange member 45 which likewise has a central aperture and is internally threaded for attaching the adapter member. The rubbery gasket member 43 extends within the central opening of the discs 41, 42 to provide a seal around the spindle 31.

In Figure 5 the cover member 50 consists of a rigid disc 51 having a grooved periphery in which is located a rubbery ring gasket 53. The disc is bolted to a flange 55 as in the cover of Figure 4. The wall of the central aperture through the disc and flange is threaded to fit the externally threaded adapter tube 17, and may be provided with a gasket member fitting over the spindle 31 if desired. The upper portion of the adapter tube is here shown in cross section and is seen to be a relatively thick-walled tube, externally threaded and provided with a threaded collar 33. The composite cover and adapter tube of Figure 5 are further illustrated in plan view in Figure 6.

Figure 8 illustrates one system for connecting a dispensing unit 22 to the adapter tube 17. In this instance, the dispensing tip of the unit 22 fits over a reducer member which is attached to the threaded end of the tube 17 by means of a collar 35. The upper bracket 20 of the press unit of Figure 2 is here shown to fit over the adapter 17 and bear against the collar 33. A cup-shaped follower plate 23 within the dispensing capsule 22 is forced back as the plastic composition 24 enters the capsule, subsequently serving to transmit air pressure from the caulking gun during application of the composition.

The action of the mixing and dispensing system of this invention will be apparent from the preceding description. The thin-walled container is protected by the flexible jacket member from bending and distortion which might otherwise be caused by the action of the agitator. The curing agent and polymer composition are rapidly mixed together in the original shipping container. Only the activating material need be transferred from its original container to the mixing and dispensing unit. The close fitting cover permits rapid mixing without loss of components. Subsequently, this same cover serves as a plunger for forcing the plastic composition from the container and into the capsules from which the composition is ultimately dispensed.

One specific type of plastic sealing composition has herein been described; but others having similar mixing and dispensing requirements are equally applicable. Likewise various equivalent structural components may be employed in place of the specific articles and materials herein identified in the mixing and dispensing system. For example, other forms of quick-acting clamps may replace those illustrated on the reinforcing jacket. Other forms of propellers or agitators may be substituted for the plate 30. Mechanical jacks are equally as effective as the hydraulic jack 21. The adapter member may be provided with collar or other means fitting against a modified upper bracket member for transmitting forces to the cover member, and the connection between adapter and dispensing capsule may be altered as needed, depending on the design of the capsule tip and on other factors. These and other analogous modifications are contemplated as coming within the scope of my invention.

What is claimed is as follows:

1. A mixing and dispensing system for handling multi-component self-curing plastic sealer compositions and the like including: a mixer assembly suitable for rapidly and effectively mechanically mixing together the multiple components of said composition in a thin-walled open-head constant-diameter shipping container and comprising a temporary protective and supporting jacket for said container, a temporary cover and pressure-plate member slidably fitting within said container and having a central orifice and a tubular adapter fitting therein, agitator means fitting within said container, and spindle means removably attached to said agitator means and passing through said orifice and said adapter for attachment to suitable torque-producing power means; and pressure-dispensing components including means for conveying said composition from the adapter tube of the covered container under pressure into a dispensing unit, and pressure-supplying means for forcing said cover into said container to cause said composition to be forced from said container through said adapter and conveyor means and into said dispensing unit.

2. In the mixing and dispensing of a multi-component self-curing plastic sealer composition, the steps including: adding, to a plastic polymeric component in its original constant-diameter open-head thin-walled shipping container, a curing agent for said component; introducing a rotary agitator blade and removably attached spindle into said container; covering said composition in said container with a closely fitting slidable cover member having a centrally located elongated adapter outlet fitting over said spindle; enclosing said container within a temporary protective and supporting jacket; mixing and agitating the components by rotating and reciprocating said spindle and its attached agitator blade to provide a homogeneous self-curing composition; removing said spindle through said adapter outlet without removing said agitator blade and said cover member from said container; and pressing said cover member into said container for dispensing said composition through said adapter.

3. A mixing and dispensing system for handling multi-component self-curing plastic sealer compositions and the like including: a mixer assembly suitable for rapidly and effectively mechanically mixing together the multiple components of said composition in a thin-walled open-head constant-diameter shipping container and comprising a temporary protective and supporting jacket for said container, an axially apertured temporary cover and pressure-plate member slidably fitting within said container and having an axial tubular adapter in line with the axial aperture, agitator means fitting within said container, and spindle means removably attached to said agitator means and passing through the axial aperture and the tubular adapter for attachment to suitable torque-producing power means; and pressure-dispensing components including means for conveying said composition under pressure from said shipping container into a dispensing unit, and pressure-supplying means for forcing said cover into said container to place said composition under dispensing pressure.

4. A mixing and dispensing system for handling multi-component self-curing plastic sealer compositions and the like including: a mixer assembly suitable for rapidly and effectively mechanically mixing together the multiple components of said composition in a thin-walled open-head constant-diameter shipping container and comprising a temporary protective and supporting jacket for said container, a temporary cover and pressure plate member slidably fitting within said container, having a central aperture and an axially extending tubular adapter in line therewith and carrying a larger resilient gasket member fitting between the inner wall of said container and the periphery of said pressure-plate and a smaller resilient gasket member fitting between the periphery of said central aperture and a spindle passing through said aperture, agitator means fitting within said container, and spindle means removably attached to said agitator means and passing through said aperture, smaller gasket member, and tubular adapter for attachment to suitable torque-producing power means; and pressure-dispensing components including means for conveying said composition under pressure from said container through said cover member into a dispensing unit, and pressure-supplying means for forcing said cover member into said container.

5. A dispensing cover member suitable for insertion within a constant-diameter open-head container in the mixing and pressure-dispensing of multi-component self-curing plastic sealer compositions as herein described, said cover member comprising a rigid axially apertured disc member, an axial tubular adapter centrally attached to said disc member in line with the axial aperture and extending from said disc for a distance at least equal to the depth of said container, a larger resilient gasket member held around the outer periphery of said disc for forming a slidable tight seal between said disc and said container, and a smaller resilient gasket member held within said axial aperture for forming a slidable tight seal between the disc and an agitator spindle passed through said aperture and said tubular adapter.

6. In combination, a dispensing cover member suitable for insertion within a constant-diameter open-head container, and an agitator spindle member rotatably and slidably fitting within an axial opening in said cover member; said cover member comprising a rigid, centrally apertured disc member loosely fitting within said container, a flexible gasket member carried by said disc member for providing a liquid-tight seal between said disc member and said container, a flexible gasket member carried by said disc member for providing a liquid-tight seal between said disc member and said spindle member, and an axial tubular member centrally attached to one side of said disc member in line with the central aperture; said spindle member passing through and extending beyond said tubular member.

References Cited in the file of this patent
UNITED STATES PATENTS

| | | |
|---|---|---|
| 1,751,660 | Saxton | Mar. 25, 1930 |
| 2,443,981 | Funk et al. | June 22, 1948 |